United States Patent [19]
Kawamura

[11] Patent Number: 5,379,362
[45] Date of Patent: Jan. 3, 1995

[54] OPTICAL FIBER CONNECTOR

[75] Inventor: Shigeto Kawamura, Yokkaichi, Japan

[73] Assignee: Sumitomo Wiring Systems, Ltd., Japan

[21] Appl. No.: 200,208

[22] Filed: Feb. 23, 1994

[30] Foreign Application Priority Data

Feb. 24, 1993 [JP] Japan .................................. 5-060907

[51] Int. Cl.$^6$ ................................................ G02B 6/36
[52] U.S. Cl. ........................................ 385/92; 385/77
[58] Field of Search ....................... 385/53, 76, 77, 78, 385/88, 92, 93, 94, 139

[56] References Cited

U.S. PATENT DOCUMENTS

| | | | |
|---|---|---|---|
| 4,212,752 | 5/1983 | Stephenson et al. | 385/76 |
| 4,712,861 | 12/1987 | Lukas et al. | 385/77 |
| 4,737,008 | 4/1988 | Ohyara et al. | 385/92 |
| 5,195,156 | 3/1993 | Freeman et al. | 385/92 |
| 5,293,581 | 3/1994 | DiMarco | 385/76 |

FOREIGN PATENT DOCUMENTS

| | | | |
|---|---|---|---|
| 7376 | 1/1990 | Japan | H01R 13/52 |
| 117215 | 12/1991 | Japan | G02B 6/42 |
| 2098354 | 11/1982 | United Kingdom | 385/92 |

Primary Examiner—Rodney B. Bovernick
Assistant Examiner—John Ngo
Attorney, Agent, or Firm—Bierman and Muserliar; Jordan B. Bierman

[57] ABSTRACT

There is disclosed an optical fiber connector wherein, when housings (11, 13) are connected to each other, slidable contact of pushing pieces (18) causes elastic elements (31) to be deformed to push down locking elements (32) and abutment of an opening effector (16) causes guide pins (33) to move upwardly to rotate a hood body (28) in an exposing direction, and when the housings (11, 13) are separated from each other, abutment of a closing effector (17) causes the guide pins (33) to move downwardly to rotate the hood body (28) in a covering direction, whereby an end surface of an optical fiber (14) is covered and exposed by the rotation of the hood body (28). The end surface of the optical fiber (14) is completely covered and protected while the elastic elements (31) are prevented from being subjected to plastic deformation, and the reliability of the end surface protection of the optical fiber (14) is increased. (FIG. 1).

9 Claims, 24 Drawing Sheets

OPTICAL FIBER CONNECTOR

BACKGROUND OF THE INVENTION

1. Field of the Invention

The present invention relates to an optical fiber connector for connecting an optical fiber to a photoelectric element.

2. Description of the Prior Art

A conventional optical fiber connector is constructed as shown in FIGS. 25 to 28 for example.

FIGS. 25 and 27 arc perspective views of an optical fiber housing in different states. FIGS. 26 and 28 arc right side sectional views of the optical fiber housing, with some portions corresponding to those of FIGS. 25 and 27 removed respectively.

The optical fiber housing 1 is thin and hollow in construction. A threading portion 1b of a mounting element 4 for mounting a protective tube 3 of an optical fiber 2 is formed integrally with a grip portion 1 a provided on the rear end side of the optical fiber housing 1. A front end of the optical fiber 2 inserted in the tube 3 fitted to the mounting element 4 is inserted into the optical fiber housing 1. A small box-like hood 5 having an opened rear surface is slidably mounted along a guide recess 1d to a coupling portion 1c to be coupled to a module housing (not shown) provided on the front end side of the, optical fiber housing 1. Although not shown, an engaging mechanism is provided to the hood 5 and the coupling portion 1c so as to prevent the hood 5 from disengaging from the coupling portion 1c.

Two ferrules 6 receiving the front ends of two optical fibers 2 are provided within the hood 5 and mounted to the coupling portion 1c of the optical fiber housing 1. Two apertures 7 are formed in the front side surface of the hood 5 so that the tips of the ferrules 6 project therethrough out of the hood 5 when the hood 5 slides rearwardly. Before the rearward sliding of the hood 5, the ferrules 6 are housed completely within the hood 5 which protects the end surfaces of the optical fibers 2. The rearward sliding of the hood 5 causes the front ends of the ferrules 6 to project outwardly of the hood 5, permitting the connection between two photoelectric elements in the module housing and the end surfaces of the optical fibers 2 when the module housing not shown is coupled to the optical fiber housing 1.

Four elastic pieces 8 are formed integrally with the optical fiber housing 1, two of the elastic pieces 8 having upwardly urged front ends on the upper surface of the coupling portion 1c of the optical fiber housing 1, the other two having downwardly urged front ends on the lower surface. The front end of each elastic piece 8 is thicker than the rear end thereof, so that the front ends of the upper elastic pieces 8 protrude upwardly of the upper surface of the hood 5, and the front ends of the lower elastic pieces 8 protrude downwardly of the lower surface of the hood 5. Before the rearward sliding of the hood 5, as shown in FIG. 26, the rear surface of the hood 5 abuts against the front surfaces of the elastic pieces 8 to prevent the hood 5 from sliding rearwardly. This prevents the front ends of the ferrules 6 from protruding outwardly of the hood 5, thereby protecting the end surfaces of the optical fibers 2.

For connection of the optical fiber housing 1 to the module housing not shown, the front ends of the elastic pieces 8 are initially deformed against the urging force as long as they enter the inside of the hood 5, and then the front ends of the ferrules 6 protrude outwardly of the hood 5 by the rearward sliding of the hood 5 as shown in FIG. 28.

Elastic locking pieces 9 are formed integrally with the optical fiber housing 1 and extending rearwardly on right and left sides of the optical fiber housing 1. Each of the elastic locking pieces 9 has a projection 10 formed centrally thereof which engages the engaging portion of the module housing to hold the connection between the optical fiber housing 1 and module housing, the photoelectric elements housed in the module housing being connected to the front ends of the optical fibers 2 inside the protruding ferrules 6. For separating the optical fiber housing 1 from the module housing, the rear ends of the elastic locking pieces 9 are deformed to disengage the projections 10, and forward sliding of the module housing permits the module housing to be separated from the optical fiber housing 1.

Although not shown, when the module housing is separated, an elastic urging member provided between the optical fiber housing 1 and the hood 5 causes the hood 5 to slide forwardly, and the hood 5 returns to the state of FIG. 26 from the state of FIG. 28. The elastic pieces 8 are restored to the state before the deformation, and the rear surface of the hood 5 abuts against the elastic pieces 8. The ferrules 6 are held within the hood 5, thereby protecting the end surfaces of the optical fibers 2.

In the conventional optical fiber connector, the hood 5 is provided directly slidably to the coupling portion 1c of the optical fiber housing 1 and encloses the ferrules 6 to protect the end surfaces of the optical fibers 2 when both of the housings are separated. However, the end surfaces of the optical fibers 2 can be seen through the apertures 7 of the hood 5 although the ferrules 6 are housed completely within the hood 5. It has been impossible to completely protect the end surfaces of the optical fibers 2. If the optical fiber connector is placed in a high-temperature atmosphere for a long period of time, with the elastic pieces 8 deformed and the hood 5 moved rearwardly, the elastic pieces 8 are deformed non-elastically to lose its restoring force, resulting in the hood 5 easily moved and not functioning to protect the end surfaces of the optical fibers 2.

Further, dust is apt to collect in the guide recess 1d of the coupling portion 1c, hindering smooth sliding of the hood 5.

SUMMARY OF THE INVENTION

The present invention is intended for an optical fiber connector including a module housing and an optical fiber housing, the module housing having a storage recess formed therein at its first end for housing a photoelectric element, the module housing further including a first opening at its second end, the optical fiber housing including a second opening at its first end, the optical fiber housing receiving at its second end an optical fiber so that a tip of the optical fiber is introduced generally to the second opening, the module housing further including a coupling portion at its second end, the optical fiber housing further including a coupling portion at its first end, the coupling portions of the module housing and optical fiber housing being connected to each other to bring an end surface of the tip of the optical fiber into contact with the photoelectric element. According to the present invention, the optical fiber connector comprises: an opening effector and a closing effector formed in different positions inside of the coupling portion of the module housing; a pushing piece formed on an upper inner side of the coupling portion of the module housing; a cylindrical introducer formed inside of the coupling portion of the module housing for introducing the tip of the optical fiber, the inside of the coupling portion communicating with the storage recess through the cylindrical introducer; a locking piece formed integrally with an upper portion of the coupling portion of the optical fiber housing; a hood body rotatably mounted in the coupling portion of the optical fiber housing for covering and exposing the end surface of the tip of the optical fiber; an elastic element formed integrally with the hood body and extending upwardly on an side surface of the hood body; a locking element formed integrally with the elastic element at its upper end and abutting against the locking piece, the locking element being pushed downwardly of the locking piece by slidable contact of the pushing piece when the housings are connected to each other; and a guide pin formed integrally with the hood body at its lower side end and moving upwardly by slidable contact of the opening effector to rotate the hood body in a direction to expose the end surface of the tip of the optical fiber when the housings are connected to each other, the guide pin moving downwardly by slidable contact of the closing effector to rotate the hood body in a direction to cover the end surface of the tip of the optical fiber when the housings are separated from each other.

According to the present invention, the hood body is rotatably mounted in the coupling portion of the optical fiber housing. When the housings are connected to each other, the slidable contact of the pushing piece causes the elastic element to be deformed to push down the locking element, and the abutment of the opening effector of the module housing causes the guide pin of the hood body to move upwardly to rotate the hood body in the exposing direction. When the housings are separated from each other, the abutment of the closing effector of the module housing causes the guide pin of the hood body to move downwardly to rotate the hood body in the covering direction. Since the end surface of the optical fiber is covered and exposed by the rotation of the hood body, the end surface of the optical fiber is completed covered and protected. When the housings are completely connected, no external forces are applied to the elastic element, and the elastic element is not subjected to the conventional plastic deformation in high-temperature use. In addition, the smooth rotation of the hood body is not prevented due to dust. The reliability of the end surface protection of the optical fiber is increased.

Preferably, the opening effector is formed on the introducer and has an inclined surface approaching the first opening at the second end of the module housing from top to bottom, and a lower portion of the hood body slidably contacts the inclined surface whereby the hood body is rotated in the direction to expose the end surface of the tip of the optical fiber when the housings are connected to each other.

When the housings are connected to each other, the lower portion of the hood body slidably contacts the inclined surface of the opening effector on the introducer whereby the hood body is rotated in the direction to expose the end surface of the optical fiber. When the housings are separated from each other, the guide pins slidably contacts the closing effectors to move downwardly, whereby the hood body is rotated in the direction to cover the end surface of the optical fiber. The end surface of the optical fiber is similarly protected.

The opening effector formed on the introducer and the closing effectors formed on the opposite side walls of the module housing enable the hood body to rotate smoothly, particularly in the covering direction.

An object of the present invention is to ensure the protection of an end surface of an optical fiber.

These and other objects, features, aspects and advantages of the present invention will become more apparent from the following detailed description of the present invention when taken in conjunction with the accompanying drawings.

DESCRIPTION OF THE PREFERRED EMBODIMENTS (First Preferred Embodiment)

Figure 1:
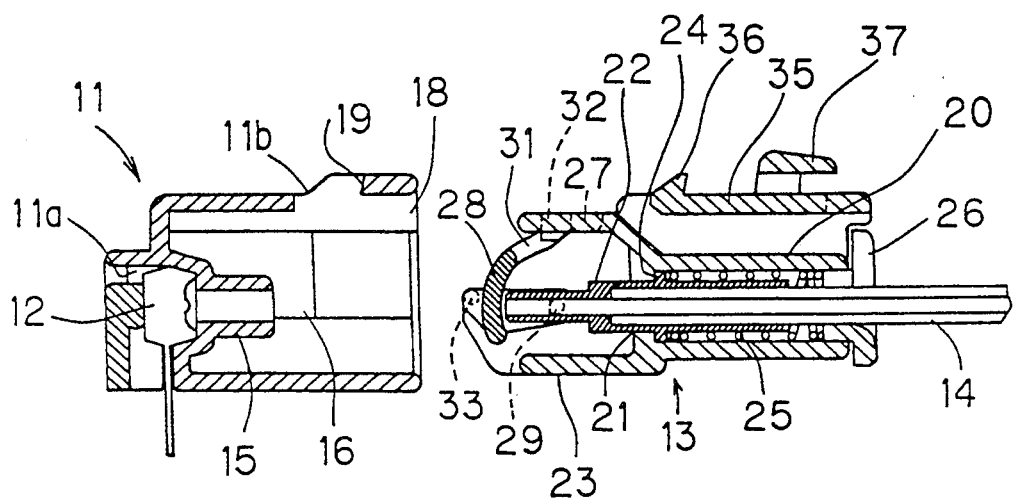
FIG. 1 is a right side sectional view of an optical fiber connector, with an optical fiber housing and a module housing separated from each other, according to a first preferred embodiment of the present invention.
Figure 2:
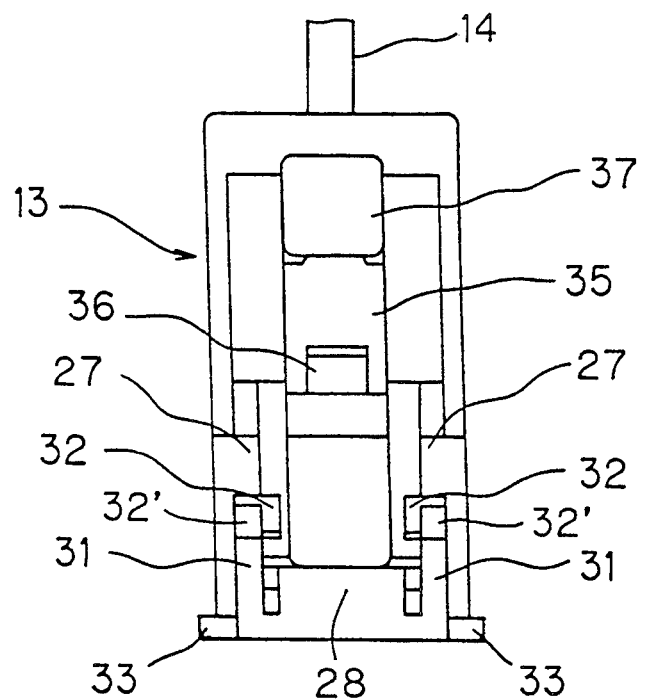
FIG. 2 is a plan view of the optical fiber housing of FIG. 1.
Figure 3:
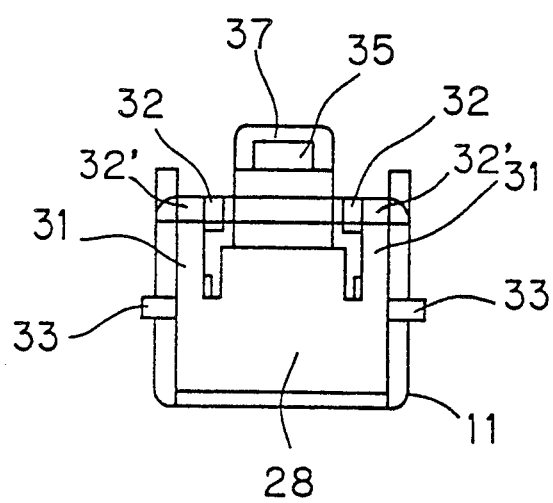
FIG. 3 is a front elevation of the optical fiber housing of FIG. 1.
Figure 4:
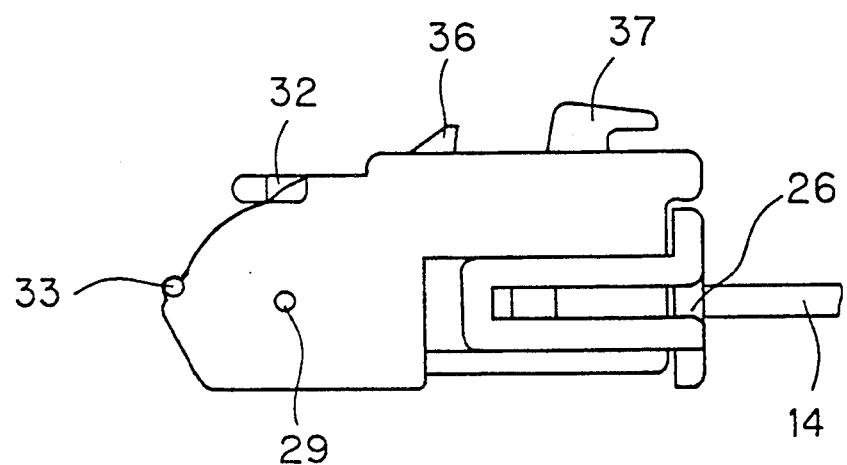
FIG. 4 is a right side elevation of the optical fiber housing of FIG. 1.
Figure 5:
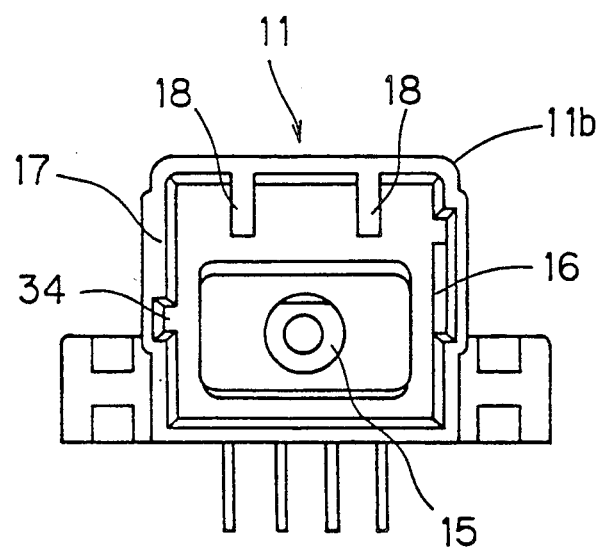
FIG. 5 is a rear elevation of the module housing of FIG. 1.
Figure 6:
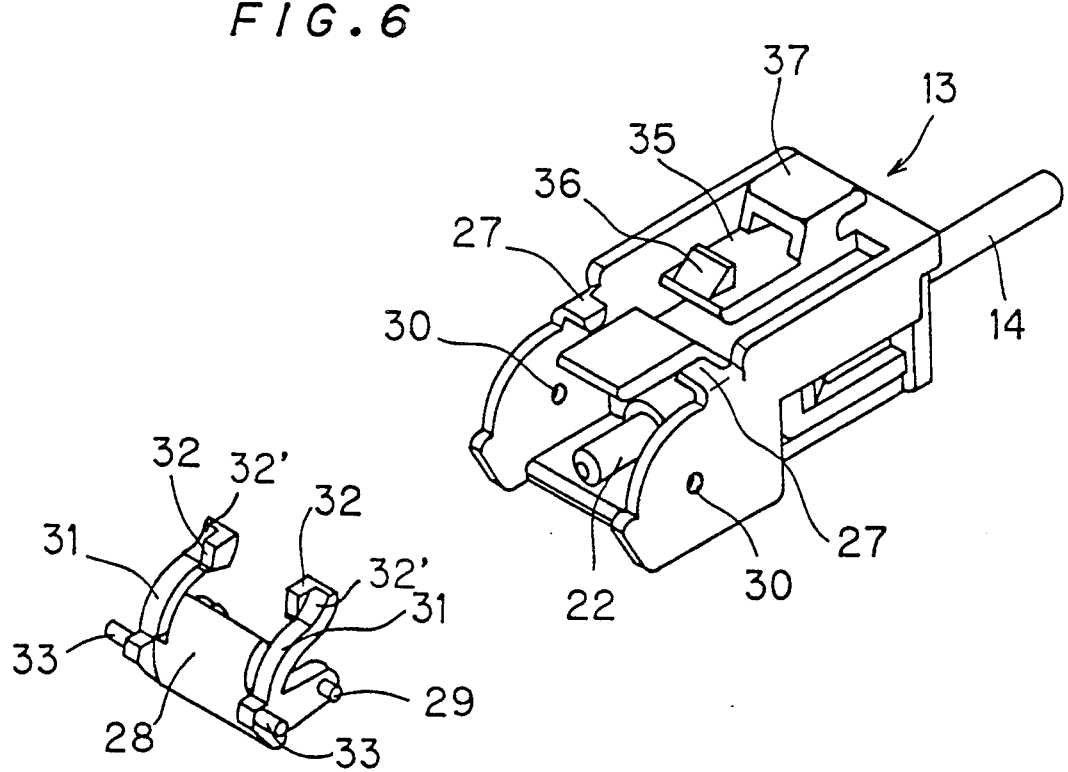
FIG. 6 is a perspective view of the optical fiber housing of FIG. 1, with a hood body separated therefrom.
Figure 7:
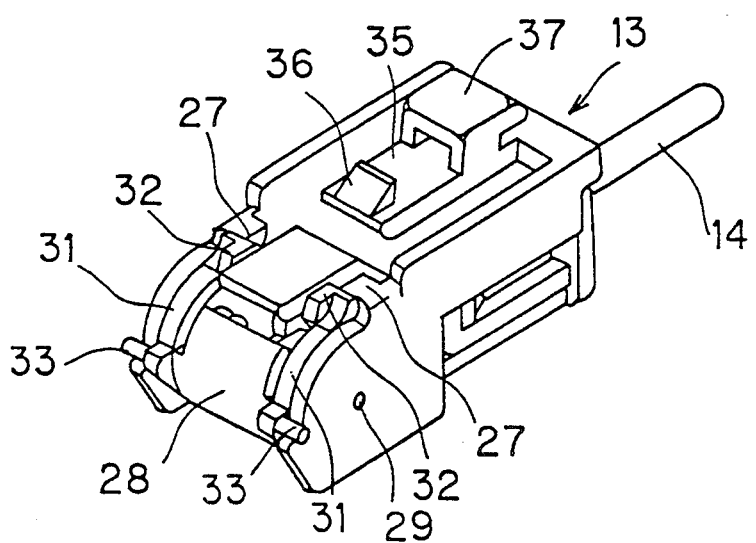
FIG. 7 is a perspective view of the optical fiber housing of FIG. 1, with the hood body rotated in a revering direction.
Figure 8:
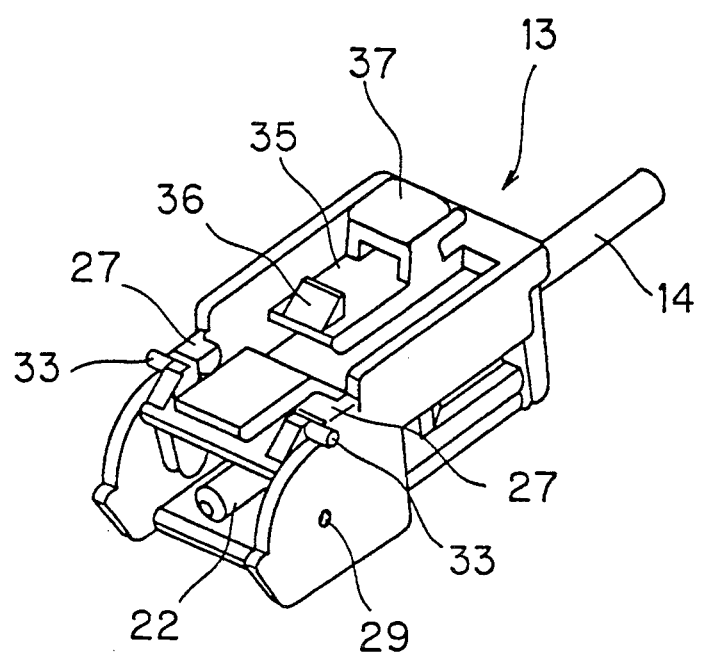
FIG. 8 is a perspective view of the optical fiber housing of FIG. 1, with the hood body rotated in an exposing direction.
Figure 9:
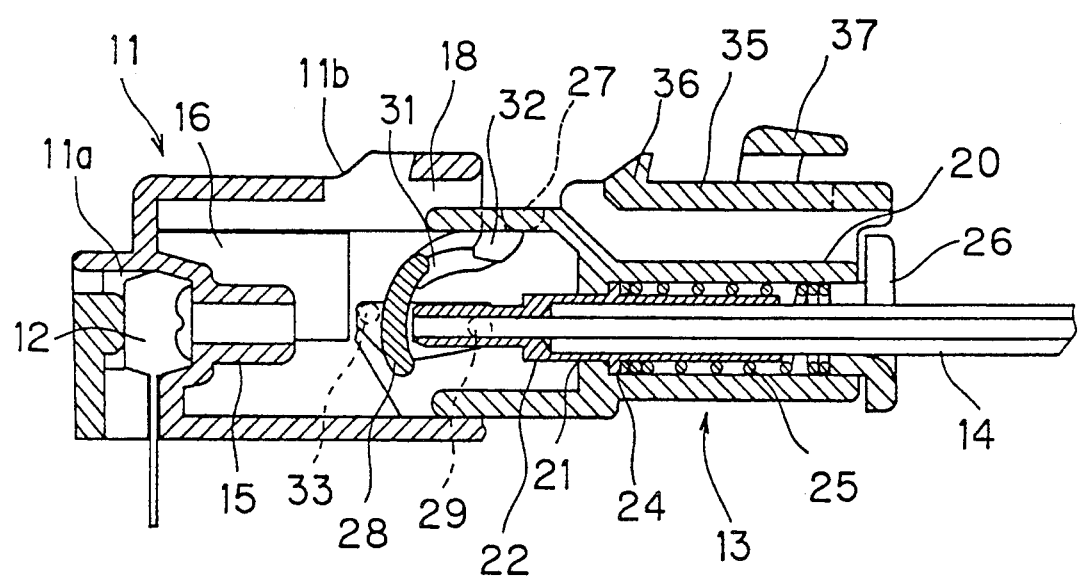
FIGS. 9 and 10 are right side sectional views of the housings being connected.
Figure 10:
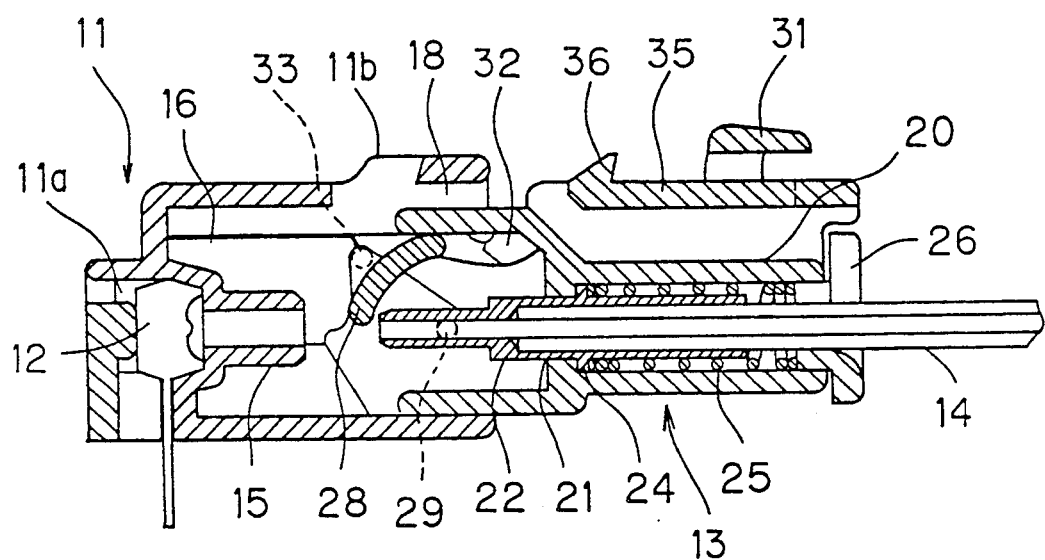
Figure 11:
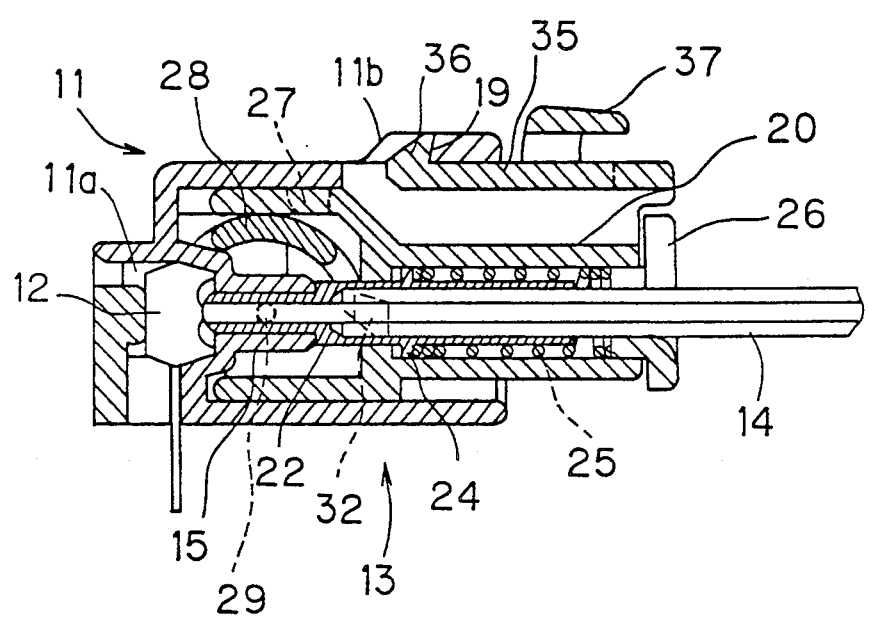
FIG. 11 is a right side sectional view of the completely connected housings.
Figure 12:
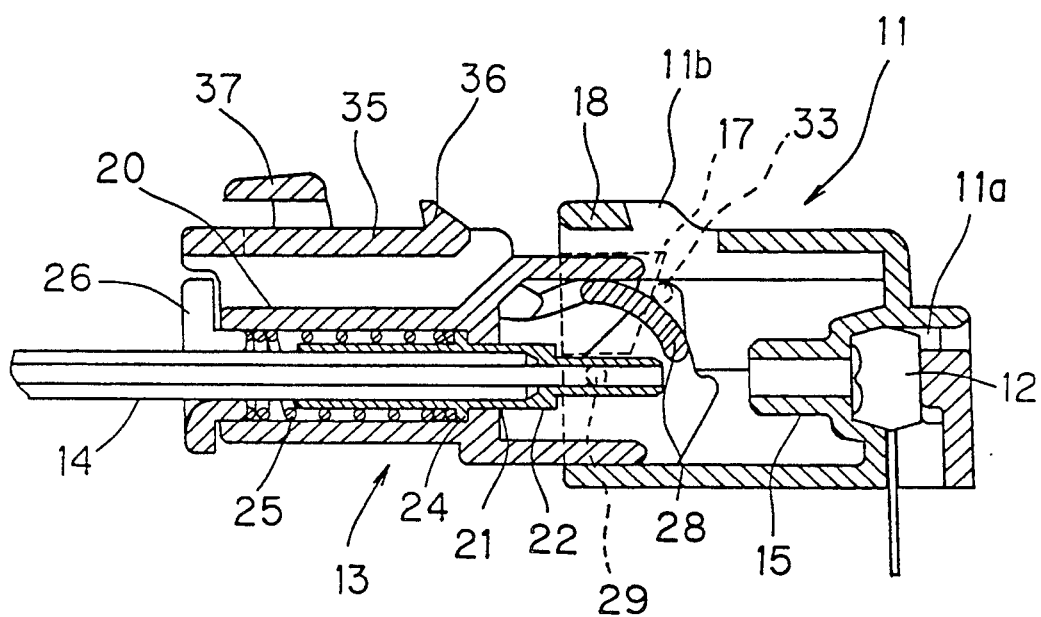
FIG. 12 is a left side sectional view of the housings being separated.
Figure 13:
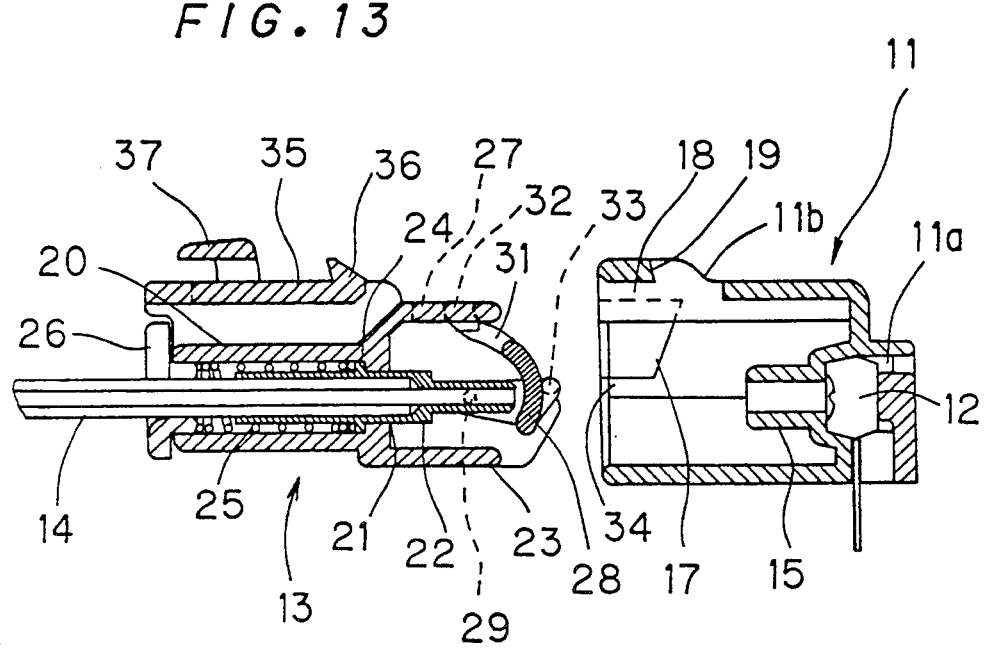
FIG. 13 is a left side sectional view of the completely separated housings.

FIGS. 1 to 13 illustrate a first preferred embodiment of an optical fiber connector according to the present invention. FIG. 1 is a right side sectional view of an optical fiber housing and a module housing separated from each other; FIG. 2 is a plan view of the optical fiber housing; FIG. 3 is a front elevation of the optical fiber housing; FIG. 4 is a right side view of the optical fiber housing; FIG. 5 is a rear elevation of the module housing; FIG. 6 is a perspective view of the optical fiber housing, with a hood body separated therefrom; FIGS. 7 and 8 are perspective views of the optical fiber housing, with the hood body rotated in a covering direction and in an exposing direction, respectively; FIGS. 9 and 10 are right side sectional views of the housings being connected; FIG. 11 is a right side sectional view of the connected housings; FIG. 12 is a left side sectional view of the housings being separated; and FIG. 13 is a left side sectional view of the separated housings.

Referring to FIGS. 1 to 13, the module housing 11 has a storage recess 11a at its inner front end in which a photoelectric element 12 is housed. First and second openings are formed respectively at a rear end of the module housing 11 and at a front end of the optical fiber housing 13. An optical fiber 14 is inserted at the rear end of the optical fiber housing 13 into the optical fiber housing 13 so that the tip of the optical fiber 14 is introduced adjacent the second opening. A cylindrical introducer 15 for introducing the tip of the optical fiber 14 is integrally formed at a position opposite the photoelectric element 12 inside a coupling portion 11b to be coupled to the optical fiber housing 13 at the rear end of the module housing 11. An opening effector 16 raised in projecting form from the front end of the coupling portion 11b toward the center thereof is formed at the inner left-hand end of the module housing 11, and a closing effector 17 raised in projecting form from the rear end of the coupling portion 11b toward the center thereof is formed at the inner right-hand end of the module housing 11. Two pushing pieces 18 are formed on the inner upper surface, at the rear end, of the coupling portion 11b of the module housing 11. A part of the rear upper surface of the coupling portion 11b of the module housing 11 is notched to form an engaging portion 19 which engages a withdrawal preventing engaging projection of the optical fiber housing 13 to be described later to hold the connection between the housings 11 and 13.

A tube 20 having a closed front surface is integrally formed in the rear half of the optical fiber housing 13 and has an aperture 21 in the center of the front surface of the tube 20. A rear half of a ferrule 22 is inserted through the aperture 21 into the tube 20 so that the front end of the ferrule 22 is disposed in a coupling portion 23 at the front end of the optical fiber housing 13. The tip of the optical fiber 14 is inserted into the ferrule 22 and the end surface of the optical fiber 14 is introduced into the coupling portion 23.

A collar 24 is formed centrally of the ferrule 22 and is positioned inside the tube 20 to abut against the rear surface periphery of the aperture 21. A spring 25 is wound around the ferrule 22 inside the tube 20, the opposite ends of the spring 25 being locked by the rear surface of the collar 24 and a cap 26 mounted in the rear surface opening of the tube 20. The collar 24 is urged forwardly by the spring 25 to prevent the ferrule 22 to move rearwardly.

Two locking pieces 27 are formed integrally with the optical fiber housing 13 in an upper portion of the coupling portion 23 of the optical fiber housing 13, and a hood body 28 is formed in the coupling portion 23 of the optical fiber housing 13. Rotary shafts 29 on opposite sides of the hood body 28 are rotatably fitted into apertures 30 on opposite side faces of the coupling portion 23. The end surface of the optical fiber 14 is covered and exposed by the rotation of the hood body 28. Two arcuate elastic elements 31 extend upwardly along the side face of the hood body 28 on right and left sides of the hood body 28 and are formed integrally therewith. Two locking elements 32 are formed integrally with locking claws 32' at the top of the elastic elements 31 and abut against the locking pieces 27. When the housings 11 and 13 are connected to each other, the slidable contact of the pushing pieces 18 force the locking elements 32 downwardly of the locking pieces 27. Two guide pins 33 are formed at the lower end on the right and left side surfaces of the hood body 28. When the housings 11 and 13 are connected, the slidable contact of the opening effector 16 forces the guide pins 33 upwardly to rotate the hood body 28 in an exposing direction to open the hood body 28. When the housings 11 and 13 are separated, the slidable contact of the closing effector 17 forces the guide pins 33 downwardly to rotate the hood body 28 in a covering direction to close the hood body 28.

It will be appreciated from FIGS. 1 to 13 that the positional relationship between the opening effector 16 and the closing effector 17 is such that the opening effector 16 is ahead of or closer to the photoelectric element 12 than the closing effector 17 and the closing effector 17 is closer to the top than the opening effector 16, the front end surface of the closing effector 17 being inclined in a direction away from the storage recess 11a from top to bottom. It is apparent from FIG. 5 that a clearance groove 34 is formed under the closing effector 17 to prevent the right-hand guide pin 33 of the hood body 28 in the covering state from abutting against the closing effector 17. Since the right-hand guide pin 33 passes through the clearance groove 34 when the housings 11 and 13 are connected, the guide pins 33 are not moved upwardly when the connection is initiated but until the connection between the housings 11 and 13 causes the left-hand guide pin 33 to abut against the rear surface of the opening effector 16, thereby rotating the hood body 28 in the exposing direction.

An integrally formed extending piece 35 extends forwardly from the rear end of the upper surface of the optical fiber housing 13 generally to the center thereof. A withdrawal preventing engaging projection 36 is formed at the front end of the extending piece 35. The withdrawal preventing engaging projection 36 engages the engaging portion 19 to prevent withdrawal of the module housing 11 from the optical fiber housing 13 when the housings 11 and 13 are connected. When the housings 11 and 13 are separated, a push-down portion 37 at the rear end of the extending piece 35 is pushed down to disengage the engaging projection 36 from the engaging portion 19, permitting the separation of the housings 11 and 13.

Description will now be given on the operation of the housings 11 and 13 when they are connected and separated.

Connection of the housings 11 and 13 is described first. By forward movement of the optical fiber housing 13 from the state shown in FIG. 1, the pushing pieces 18 come into slidable contact with the locking elements 32, and the elastic elements 31 are deformed, the locking elements 32 being then forced downwardly of the locking pieces 27, as shown in FIG. 9.

As the optical fiber housing 13 moves further forwardly, the guide pins 33 in slidable contact with the rear surface of the opening effector 16 moves upwardly as shown in FIG. 1(), accompanied by the rotation of the hood body 28 in the exposing direction to expose the end surface of the optical fiber 14. Then the tip of the ferrule 22 is introduced into the introducer 15 and the end surface of the optical fiber 14 contacts and is coupled to the photoelectric element 12 as shown in FIG. 11. At the same time, the engagement between the engaging projection 36 and the engaging portion 19 prevents separation of the housings 11 and 13. The connection of the housings 11 and 13 is completed.

It is apparent from FIG. 11 that, when the housings 11 and 13 are completely connected and the hood body 28 is rotated in the exposing direction, the locking elements 32 have been rotated to a low position levelled with the rotary shafts 29 of the hood body 28. Thus, no external forces are applied to the locking elements 32 and the elastic elements 31. In such a state, the elastic elements 31 are not deformed plastically after a prolonged use of the optical fiber connector in high-temperature environments.

Separation of the housings 11 and 13 will be described below. By pushing down the push-down portion 37 and the entire extending piece 35, the engaging projection 36 and the engaging portion 19 are disengaged from each other, permitting the optical fiber housing 13 to move rearwardly. The rearward movement of the optical fiber housing 13 brings the guide pins 33 into slidable contact with the front surface of the closing effector 17, accompanied by the rotation of the hood body 28 in the covering direction as shown in FIG. 12. Further rearward movement of the optical fiber housing 13 causes the right-hand guide pin 33 to enter the clearance groove 34 under the closing effector 17, and the right-hand guide pin 33 slides rearwardly within the bounds of the groove 34.

As the right-hand guide pin 33 enters the groove 34, the locking elements 32 project forwardly from under the locking pieces 27 to abut against the front surface of the locking pieces 27. The abutment of the locking elements 32 prevents the rotation of the hood body 28 which in rum securely covers the end surface of the optical fiber 14.

Referring to FIG. 13, the optical fiber housing 13 moves further rearwardly, and the separation of the housings 11 and 13 is completed.

According to the first preferred embodiment, the hood body 28 rotatably provided in the coupling portion 23 of the optical fiber housing 13 is rotated in the exposing and covering directions as the housings are connected and separated to expose and cover the end surface of the optical fiber 14, respectively. In the separated state, the end surface of the optical fiber 14 is completely covered and protected. In the connected state, no external forces are applied to the elastic elements 31 unlike the prior art, and the elastic elements 31 are prevented from being subjected to the plastic deformation in high-temperature use. Furthermore, eliminated is the likelihood of the unsmooth rotation of the hood body 28 of the prior art due to dust.

(Second Preferred Embodiment)

Figure 14:
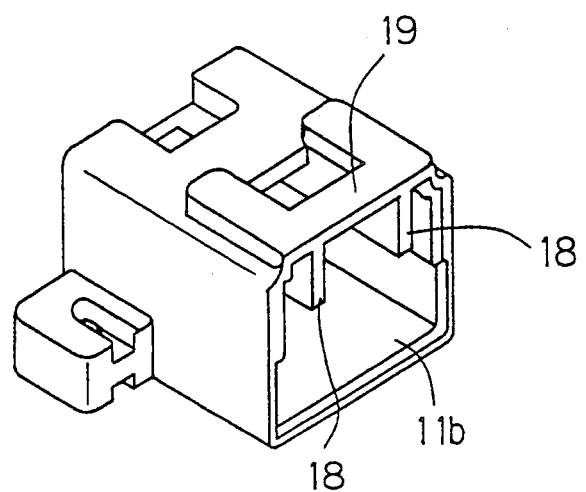
FIG. 14 is a perspective view of the module housing according to a second preferred embodiment of the present invention.
Figure 15:
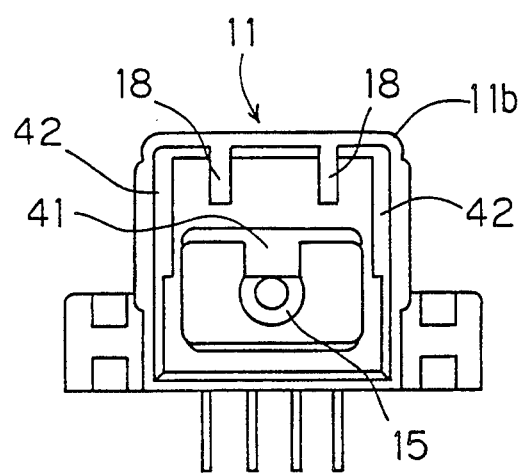
FIG. 15 is a rear elevation of the module housing of FIG. 14.
Figure 16:
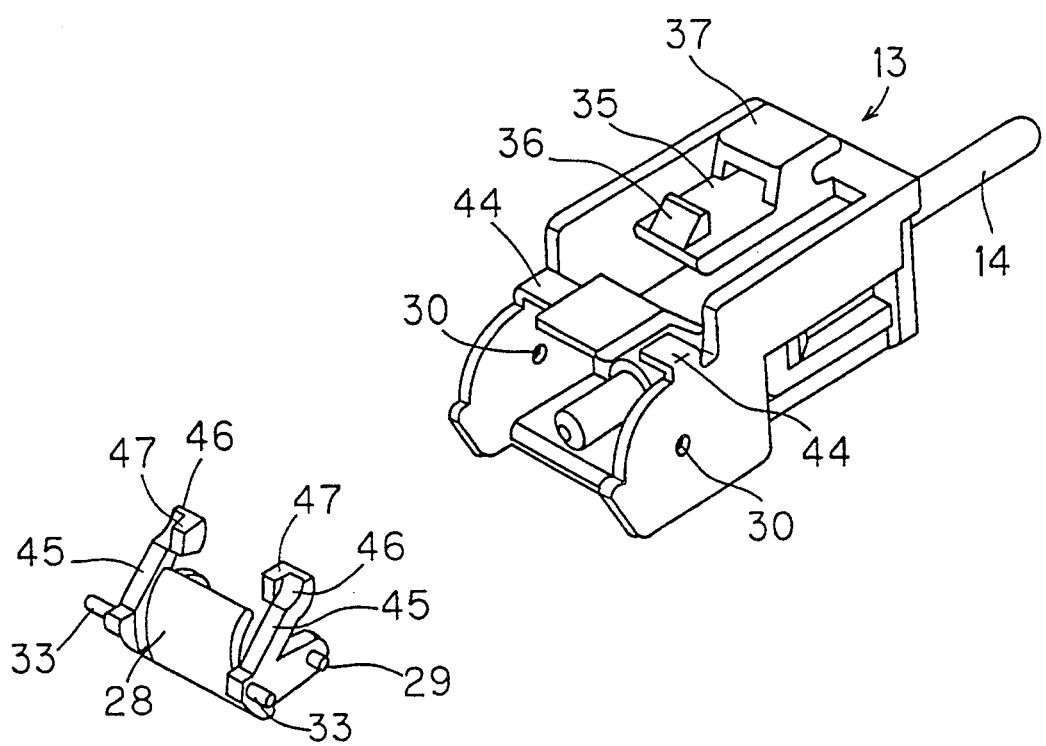
FIG. 16 is a perspective view of the optical fiber housing of the second preferred embodiment, with the hood body separated therefrom.
Figure 17:
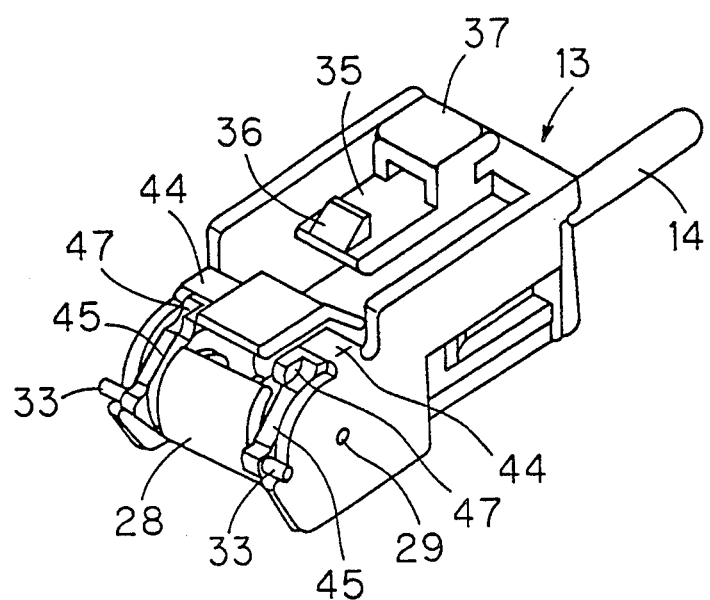
FIG. 17 is a perspective view of the optical fiber housing of FIG. 16, with the hood body rotated in the covering direction.
Figure 18:
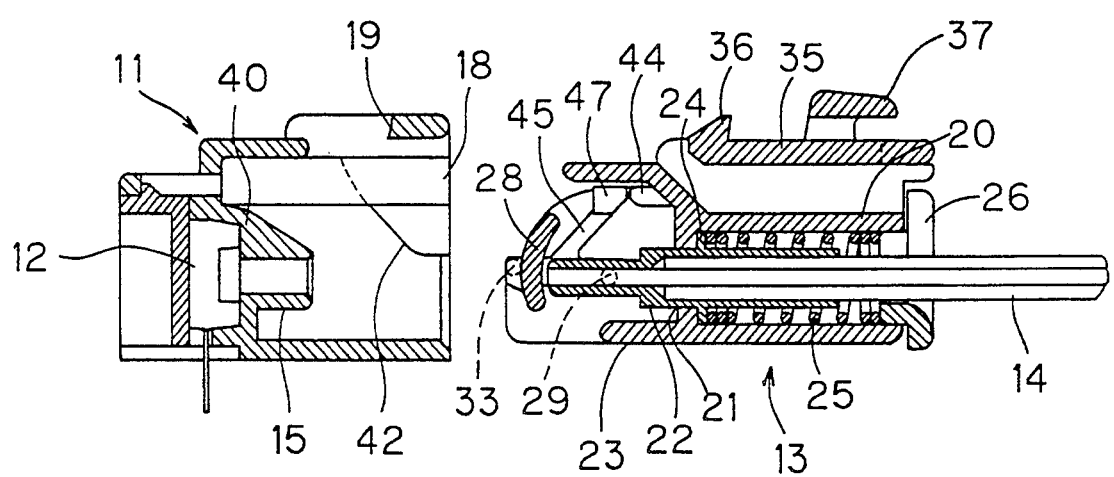
FIG. 18 is a right side sectional view of the separated housings of the second preferred embodiment.
Figure 19:
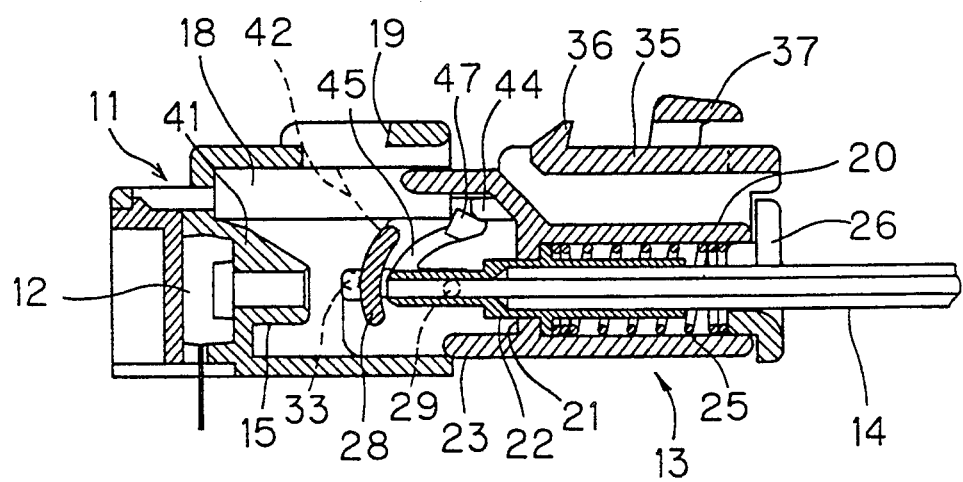
FIGS. 19 and 20 are right side sectional views of the housings of FIG. 18 being connected.
Figure 20:
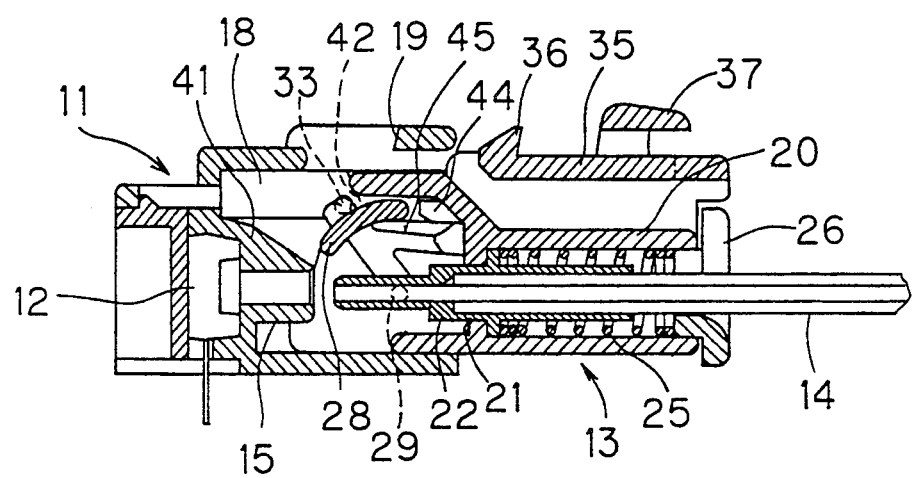
Figure 21:
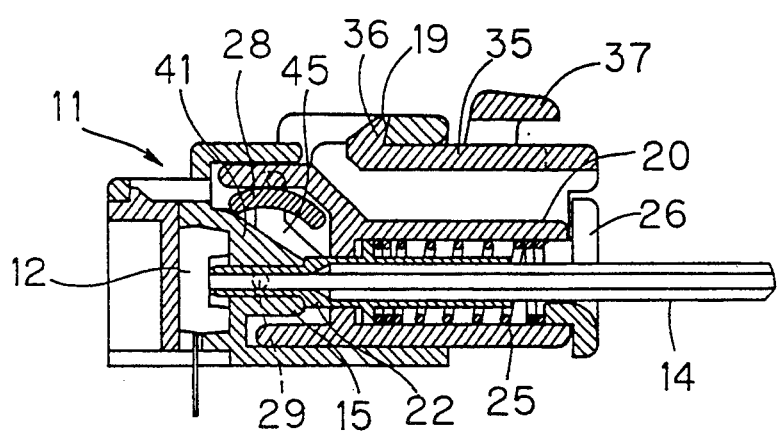
FIG. 21 is a right side sectional view of the completely connected housings of FIG. 18.
Figure 22:
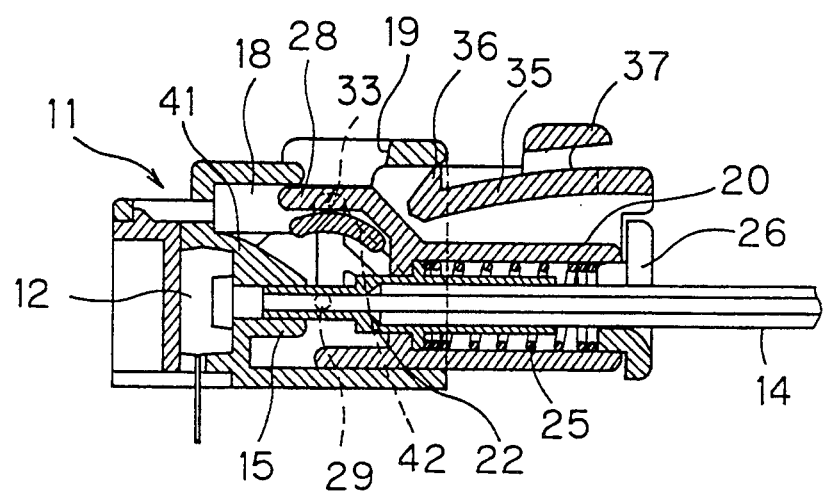
FIG. 22 is a right side sectional view of the housings of FIG. 18 being separated.
Figure 23:
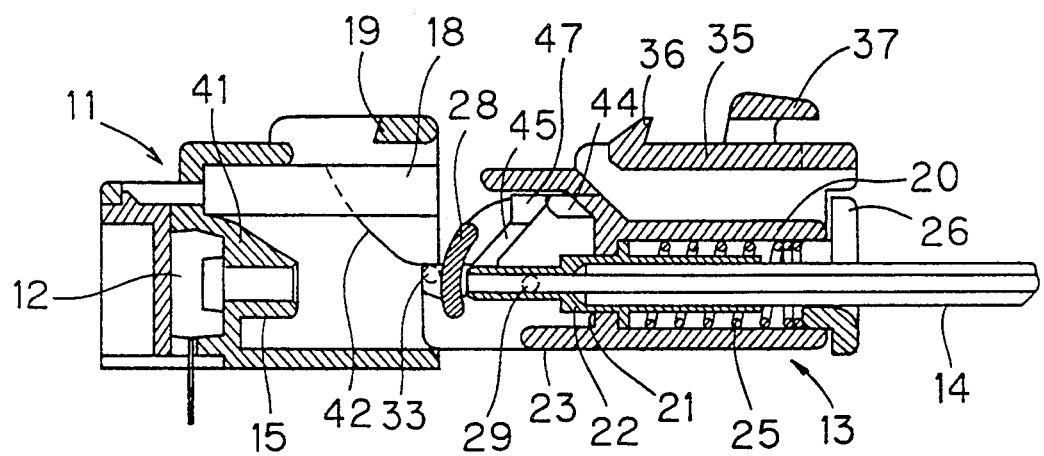
FIG. 23 is a right side sectional view of the completely separated housings of FIG. 18.
Figure 24:
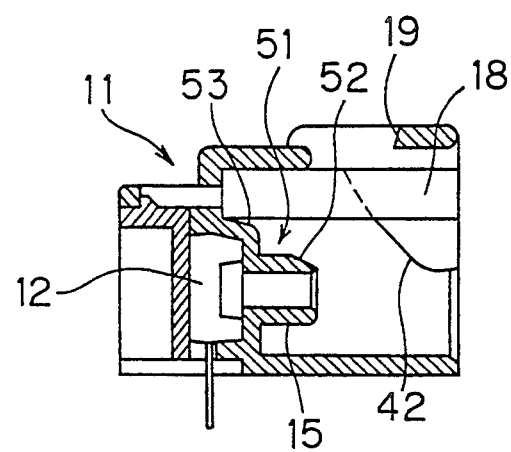
FIG. 24 is a right side sectional view of the module housing according to a third preferred embodiment of the present invention.
Figure 25:
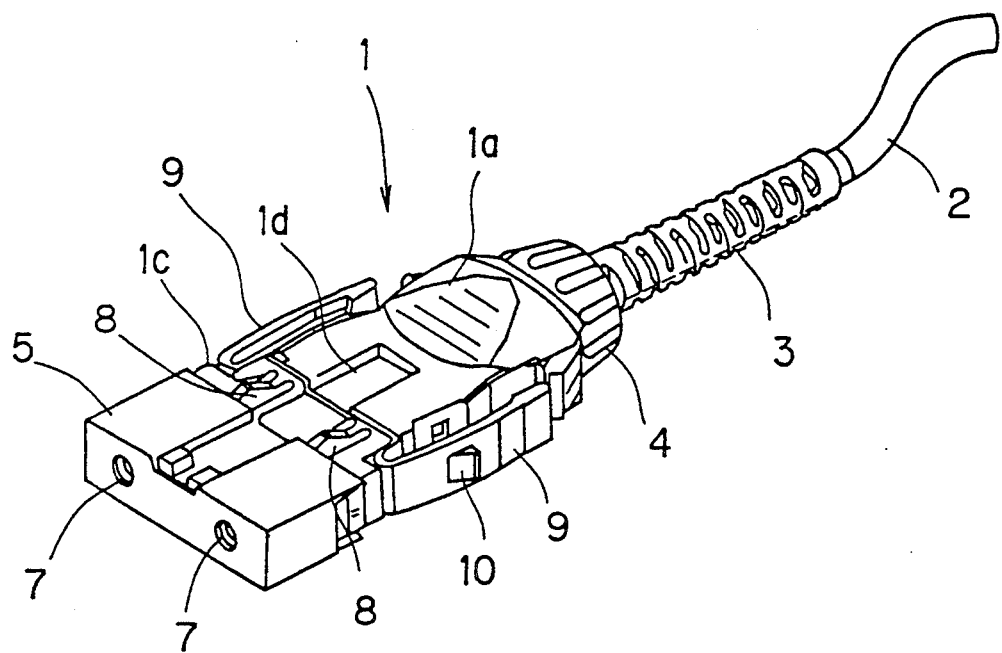
FIG. 25 is a perspective view of the optical fiber housing in a state for a conventional optical fiber connector.
Figure 26:
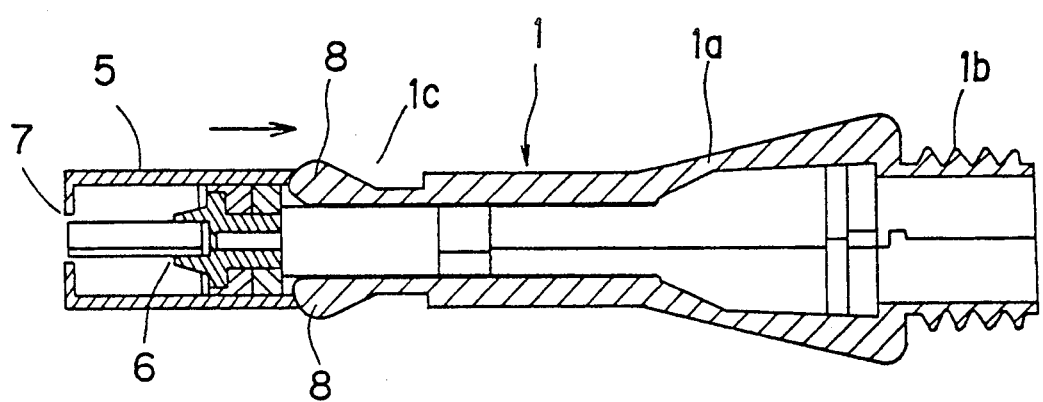
FIG. 26 is a right side sectional view of a part of FIG. 25.
Figure 27:
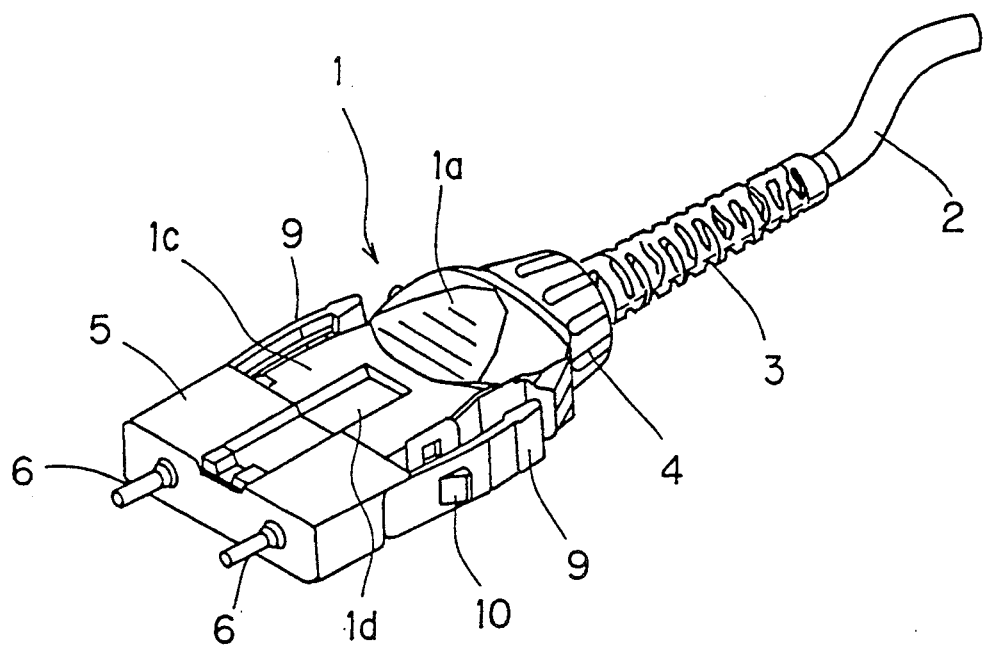
FIG. 27 is a perspective view of a state different from that of FIG. 25.
Figure 28:
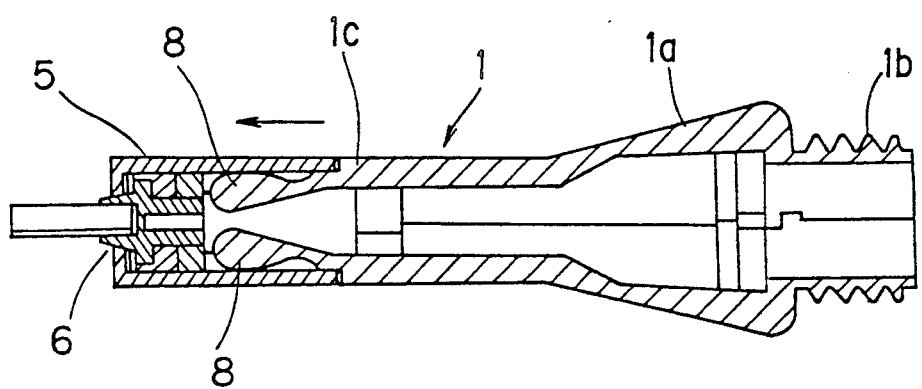
FIG. 28 is a right side sectional view of a part of FIG. 27.

FIGS. 14 to 23 illustrate a second preferred embodiment according to the present invention. FIGS. 14 and 15 are a perspective view and a rear elevation of the module housing; FIG. 16 is a perspective view of the optical fiber housing, with the hood body separated therefrom; FIG. 17 is a perspective view of the optical fiber housing, with the hood body rotated in the covering direction; FIG. 18 is a right side sectional view of the separated housings; FIGS. 19 and 20 are right side sectional views of the housings being connected; FIG. 21 is a right side sectional view of the connected housings; FIG. 22 is a right side sectional view of the housings being separated; and FIG. 23 is a right side sectional view of the separated housings.

The housings 11 and 13 of the second preferred embodiment are substantially similar in construction to those of the first preferred embodiment except the following differences.

Referring to FIGS. 14, 15 and 18, the differences in the module housing 11 are that an opening effector 41 formed on the introducer 15 and having an inclined surface 40 approaching the opening from top to bottom is substituted for the opening effector 16 of the first preferred embodiment and that closing effectors 42 raised in inwardly projecting form and extending from the rear end of an upper half of the right and left inner walls of the coupling portion 11b toward the center of the coupling portion 11b are substituted for the closing effector 17 of the first preferred embodiment, each of the closing effectors 42 having a front end surface inclined in a direction away from the storage recess 11a from top to bottom.

Referring to FIGS. 16 and 17, the differences in the optical fiber housing 13 are that locking pieces 44 are formed at a position slightly lower than the locking pieces 27 of the first preferred embodiment, that two linear elastic elements 45 extending obliquely upwardly on left and right sides of the hood body 28 are formed integrally with the hood body 28 unlike the elastic elements 31 of the first preferred embodiment, that locking claws 46 similar to the locking claws 32' of the first preferred embodiment are formed at the upper end of the elastic elements 45, and that locking elements 47 are formed integrally with the locking claws 46, respectively. The locking elements 47 abut against the locking pieces 44 and are pushed downwardly of the locking pieces 44 by slidable contact of the pushing pieces 18 when the housings 11 and 13 are connected.

As the locking elements 47 are forced downwardly of the locking pieces 44 when the housings 11 and 13 are connected, the hood body 28 rotates slightly in the exposing direction so that the lower portion of the hood body 28 is permitted to slidably contact the inclined surface of the opening effector 41. As the lower portion of the hood body 28 slidably contacts the inclined surface of the opening effector 41, the hood body 28 rotates in the exposing direction. When the housings 11 and 13 are separated, the slidable contact of the guide pins 33 with the inclined surfaces of the closing effectors 42 causes the guide pins 33 to move downwardly. As the guide pins 33 moves downwardly, the hood body 28 rotates in the covering direction.

Description will now be given on the operation of the housings 11 and 13 when they are connected and separated.

Connection of the housings 11 and 13 is discussed first. By forward movement of the optical fiber housing 13 from the state of FIG. 18, the rear ends of the pushing pieces 18 slidably contact the locking elements 47 as shown in FIG. 19. Then the elastic elements 45 are deformed, and the locking elements 47 are forced downwardly of the locking pieces 44.

As the optical fiber housing 13 moves further forwardly, the lower portion of the hood body 28 is enabled to come into slidable contact with the inclined surface of the opening effector 41 as shown in FIG. 20. As the optical fiber housing 13 moves forwardly, the lower portion of the hood body 28 slidably contacts the inclined surface of the opening effector 41 and the hood body 28 rotates in the exposing direction as shown in FIG. 21, whereas the tip of the ferrule 22 is introduced into the introducer 15 and the end surface of the optical fiber 14 contacts and is coupled to the photoelectric element 12. At the same time the engagement of the engaging projection 36 with the engaging portion 19 prevents separation of the housings 11 and 13 from each other. The connection of the housings 11 and 13 is completed.

It will be apparent from FIG. 21 that, when the housings 11 and 13 are completely connected and the hood body 28 is rotated in the exposing direction, the engaging elements 47 have been rotated to the low position levelled with the rotary shafts 29 of the hood body 28 similarly to the FIG. 11 case. Thus, no external forces are applied to the locking elements 47 and the elastic elements 45. In such a state, the elastic elements 45 are not deformed non-elastically after a prolonged use of the optical fiber connector in high-temperature environments.

Separation of the housings 11 and 13 is discussed below. By pushing down the push-down portion 37 and the whole extending piece 35, the engaging projection 36 and the engaging portion 19 are disengaged from each other, permitting the optical fiber housing 13 to move rearwardly. The rearward movement of the optical fiber housing 13 brings the guide pins 33 into slidable contact with the inclined surfaces of the closing effectors 42 at their front ends to move the guide pins 33 downwardly as shown in FIG. 22, accompanied by the rotation of the hood body 28 in the covering direction. By further rearward movement of the optical fiber housing 13, pushing of tile locking elements 47 downwardly of the locking pieces 44 is released as the guide pins 33 slidably contact the inclined surfaces as shown in FIG. 23. The rear surfaces of the locking elements 47 abut against the front surfaces of the locking pieces 44. The hood body 28 is prevented from rotating to securely cover the end surface of the optical fiber 14. Further rearward movement of the optical fiber housing 13 completes the separation of the housings 11 and 13. According to the second preferred embodiment, the closing effectors 42 formed on the opposite inner side walls of the coupling portion 11b of the module housing 11 provides for smoother rotation of the hood body 28 in the covering direction than the closing effector of the first preferred embodiment provided on one side wall, as well as the effects similar to those of the first preferred embodiment.

A third preferred embodiment is applicable according to the present invention wherein the upper portion of the introducer 15 is used as an opening effector 51 having rearwardly inclined surfaces 52, 53 at its rear and front ends.

It should be noted that the structure of the hood body 28 rotatably mounted in the coupling portion 23 of the optical fiber housing 13 is not limited to the above-mentioned preferred embodiments.

While the invention has been shown and described in detail, the foregoing description is in all aspects illustrative and not restrictive. It is therefore understood that numerous modifications and variations can be devised without departing from the scope of the invention.

What is claimed is:

1. An optical fiber connector including a module housing and an optical fiber housing, said module housing having a storage recess formed therein at its first end for housing a photoelectric element, said module housing further including a first opening at its second end, said optical fiber housing including a second opening at its first end, said optical fiber housing receiving at its second end an optical fiber so that a tip of said optical fiber is introduced generally to said second opening, said module housing further including a coupling portion at its second end, said optical fiber housing further including a coupling portion at its first end, said coupling portions of the module housing and optical fiber housing being connected to each other to bring an end surface of the tip of said optical fiber into contact with said photoelectric element, said optical fiber connector comprising:

an opening effector and a closing effector formed in different positions inside of said coupling portion of said module housing;

a pushing piece formed on an upper inner side of said coupling portion of said module housing;

a cylindrical introducer formed inside of said coupling portion of said module housing for introducing the tip of said optical fiber, the inside of said coupling portion of said module housing communicating with said storage recess through said cylindrical introducer;

a locking piece formed integrally with an upper portion of said coupling portion of said optical fiber housing;

a hood body rotatably mounted in said coupling portion of said optical fiber housing for covering and exposing the end surface of the tip of said optical fiber;

an elastic element formed integrally with said hood body and extending upwardly on a side surface of said hood body;

a locking element formed integrally with said elastic element at its upper end and abutting against said locking piece, said locking element being pushed downwardly of said locking piece by slidable contact of said pushing piece when said housings are connected to each other; and a guide pin formed integrally with said hood body at its lower side end and moving upwardly by slidable contact of said opening effector to rotate said hood body in a direction to expose said end surface of the tip of said optical fiber when said housings are connected to each other, said guide pin moving downwardly by slidable contact of said closing effector to rotate said hood body in a direction to cover said end surface of the tip of said optical fiber when said housings are separated from each other.

2. The optical fiber connector of claim 1, wherein
said opening effector is formed integrally with an inner surface of a first side wall of said coupling portion of said module housing, and
said closing effector is formed integrally with an inner surface of a second side wall of said coupling portion of said module housing.

3. The optical fiber connector of claim 9 wherein
said opening effector is closer to said storage recess than said closing effector is.

4. The optical fiber connector of claim 2, wherein
said opening effector is formed on the first side wall inner surface of said coupling portion of said module housing in projecting form extending from said first end of said module housing toward the center thereof.

5. The optical fiber connector of claim 2, wherein
said closing effector is formed on the second side wall inner surface of said coupling portion of said module housing in projecting form extending from said second end of said module housing toward the center thereof.

6. The optical fiber connector of claim 5, wherein
said closing effector has an end surface inclined in a direction away from said storage recess from top to bottom adjacent the center of said coupling portion of said module housing.

7. The optical fiber connector of claim 1, wherein
said opening effector is formed on said introducer and has an inclined surface approaching said first opening at the second end of said module housing from top to bottom, and a lower portion of said hood body slidably contacts said inclined surface whereby said hood body is rotated in the direction to expose the end surface of the tip of said optical fiber when said housings are connected to each other.

8. The optical fiber connector of claim 7, wherein
said guide pin includes a pair of guide pins formed integrally with said hood body at its opposite lower side ends,
said closing effector includes a pair of closing effectors,
said closing effectors are formed on opposite side wall inner surfaces of said coupling portion of said module housing in projecting form extending from said second end of said module housing toward the center thereof, and
said pair of guide pins slidably contact said pair of closing effectors to move downwardly whereby said hood body is rotated in the direction to cover the end surface of the tip of said optical fiber when said housings are separated from each other.

9. The optical fiber connector of claim 8, wherein
each of said closing effectors has an end surface inclined in a direction away from said storage recess from top to bottom adjacent the center of said coupling portion of said module housing.

* * * * *